United States Patent
Gueuning et al.

(10) Patent No.: US 10,442,526 B2
(45) Date of Patent: Oct. 15, 2019

(54) SYSTEM FOR THE DUAL MANAGEMENT OF ANTI-ICING AND BOUNDARY-LAYER SUCTION ON AN AEROFOIL OF AN AIRCRAFT

(71) Applicant: SONACA, Gosselies (BE)

(72) Inventors: Dimitri Gueuning, Rixensart (BE); Stephane Debaisieux, Sart-Dames-Avelines (BE)

(73) Assignee: SONACA, Gosselies (BE)

( * ) Notice: Subject to any disclaimer, the term of this patent is extended or adjusted under 35 U.S.C. 154(b) by 335 days.

(21) Appl. No.: 15/519,038

(22) PCT Filed: Oct. 19, 2015

(86) PCT No.: PCT/EP2015/074088
§ 371 (c)(1),
(2) Date: Apr. 13, 2017

(87) PCT Pub. No.: WO2016/062645
PCT Pub. Date: Apr. 28, 2016

(65) Prior Publication Data
US 2017/0217569 A1    Aug. 3, 2017

(30) Foreign Application Priority Data
Oct. 20, 2014  (BE) .................................. 2014/5019

(51) Int. Cl.
*B64C 21/06* (2006.01)
*B64D 15/04* (2006.01)
(Continued)

(52) U.S. Cl.
CPC ................ *B64C 21/06* (2013.01); *B64C 3/28* (2013.01); *B64C 5/06* (2013.01); *B64D 15/04* (2013.01);
(Continued)

(58) Field of Classification Search
CPC ........ B64D 15/02; B64D 15/04; B64C 21/06; B64C 21/02; B64C 21/025; B64C 2230/06; B64C 2230/00; B64C 2230/22
See application file for complete search history.

(56) References Cited

U.S. PATENT DOCUMENTS 3,093,350 A * 6/1963 Wilkins .................... B64C 3/50
                                                   244/203
5,114,100 A * 5/1992 Rudolph ................. B64C 21/06
                                                   244/130
(Continued)

FOREIGN PATENT DOCUMENTS

| EP | 0 436 243 A2 | 7/1991 |
| EP | 0 836 989 A2 | 4/1998 |
| EP | 1 327 489 A1 | 7/2003 |

OTHER PUBLICATIONS

International Search Report dated Jan. 8, 2016 in PCT/EP2015/074088 filed Oct. 19, 2015.
(Continued)

*Primary Examiner* — Philip J Bonzell
*Assistant Examiner* — Tye William Abell
(74) *Attorney, Agent, or Firm* — Oblon, McClelland, Maier & Neustadt, L.L.P.

(57) ABSTRACT

For dual management of anti-icing and boundary-layer suction, a system for an aerofoil of an aircraft, including: a channel having a double function of anti-icing and boundary-layer suction; a double-function main pipe to which a device for monitoring the boundary-layer suction and a device for monitoring anti-icing are connected; an anti-icing air-intake pipe connecting the main pipe and the channel; a non-return valve enabling anti-icing air to go from the main pipe to the pipe; at least one suction-air collection pipe
(Continued)

connecting the channel and the main pipe; and a non-return valve enabling suction air to pass from the pipe toward the main pipe.

16 Claims, 8 Drawing Sheets

(51) Int. Cl.
    *B64C 3/28*           (2006.01)
    *B64C 5/06*           (2006.01)

(52) U.S. Cl.
    CPC ...... *B64C 2230/00* (2013.01); *B64C 2230/06* (2013.01); *B64C 2230/22* (2013.01); *Y02T 50/166* (2013.01)

(56) References Cited

U.S. PATENT DOCUMENTS

| | | | |
|---|---|---|---|
| 5,348,256 A | | 9/1994 | Parikh |
| 5,899,416 A | * | 5/1999 | Meister .................. B64C 21/06 |
| | | | 244/207 |
| 7,673,832 B2 | * | 3/2010 | Meister ................. B64C 21/025 |
| | | | 244/123.1 |
| 2016/0332724 A1 | * | 11/2016 | Mehring ............... F28F 13/003 |

OTHER PUBLICATIONS

Belgian Search Report dated Jul. 9, 2015 in BE 201405019 filed Oct. 20, 2014.

* cited by examiner

SYSTEM FOR THE DUAL MANAGEMENT OF ANTI-ICING AND BOUNDARY-LAYER SUCTION ON AN AEROFOIL OF AN AIRCRAFT

TECHNICAL FIELD

This invention relates to the field of management of the anti-icing function of an aerofoil of an aircraft, and of the management of the boundary-layer suction on this same aerofoil.

The aerofoils concerned are preferably the wings or the empennage of the aircraft.

The invention applies to all types of aircraft, in particular commercial aircraft.

PRIOR ART

From prior art, anti-icing systems are known for aircraft wings, comprising channels through which circulate hot air taken from the engines, in order to prevent the forming of ice on the wings. The main phases of flight during which such a system is actuated are takeoff, landing, or holding for landing.

From prior art, also known are boundary-layer suction systems on the wings. This suction is carried out using channels partially delimited by the outer skin of the wing, which is multiperforated in order to allow for the suction. The purpose of the latter is to decrease the drag of the wings. It is substantially implemented during the cruise phase.

On the wing, the anti-icing channels and the suction channels of the boundary layer can be arranged alternately. However, in certain zones of the aerofoil such as for example the nose of the leading edge, there may be an interest in alternatively providing the anti-icing function, and that of boundary-layer suction. This need can lead to the implementing of one or several double-function pipes, wherein can alternatively circulate the anti-icing air and air for boundary-layer suction. This type of embodiment is for example known in document U.S. Pat. No. 7,673,832.

However, the solution described in this document requires a substantial number of air pipes and controlled valves, which substantially impact the encumbrance and the global mass of the system. In addition, the electrical control of all of the valves negatively affects the reliability of this system for the dual management of the anti-icing function and boundary-layer suction.

SUMMARY OF THE INVENTION

The invention as such has for purpose to overcome at least partially the disadvantages pertaining to embodiments of prior art.

To do this, the invention first of all has for object a system for anti-icing and boundary-layer suction, intended to be provided on an aerofoil of an aircraft, with the system comprising at least one double-function channel wherein can alternatively circulate air pour the anti-icing function and air for boundary-layer suction, said double-function channel being partially delimited by a multiperforated wall allowing for the suction of the boundary layer on said aerofoil, with the system comprising:
a device for monitoring the suction of the boundary layer;
a device for monitoring anti-icing;
a main double-function pipe, to which are connected the device for monitoring the suction of the boundary layer, and the device for monitoring anti-icing;
an anti-icing air-intake pipe enabling the communication between the main pipe and the double-function channel;
a first non-return valve enabling the anti-icing air to go only from the main pipe to the anti-icing air-intake pipe;
at least one suction-air collection pipe enabling the communication between the double-function channel and the main pipe; and
a second non-return valve enabling the suction air to go only from the suction-air collection pipe, to the main pipe.

The invention is remarkable in that it makes it possible to obtain a reduced mass and encumbrance, while still improving the reliability of existing systems. The fact that the anti-icing air-intake pipe and the suction-air collection pipe are both connected to the double-function channel and to the main pipe, makes it possible to cleverly manage the two anti-icing and boundary-layer suction functions.

Indeed, when the anti-icing air circulates in the anti-icing air-intake pipe then in the double-function channel, it then remains free to borrow the suction-air collection pipe. However, the anti-icing air remains advantageously confined in this suction-air collection pipe, without being able to join the main pipe. Effectively, although the second non-return valve enables the circulation of the air in the direction going from the suction-air collection pipe to the main pipe, the anti-icing air cannot penetrate into this last pipe, due to the higher air pressure inside the latter. In other terms, the anti-icing air located in the downstream portion of the suction-air collection pipe has a lower pressure due to the load loss subjected during it conveyance through successively the anti-icing air-intake pipe, the double-function channel, then the suction-air collection pipe. The pressure drop is all the more so substantial that during its passage in the double-function channel, a portion of the anti-icing air is evacuated through the multiperforation made on this channel. The blocking of the anti-icing air downstream of the suction-air collection pipe is as such advantageously obtained by a simple phenomenon of a difference in pressure, in such a way that the reliability of the system is reinforced, in particular compared to a system of multiple electrically-controlled valves.

In addition, the encumbrance and the mass are reduced, in particular thanks to the implementing of the main pipe used alternatively for the management of the two functions. Indeed, the management of the boundary-layer suction function is operated by simply having the suction air circulate in the double-function channel, then in the suction-air collection pipe, before this air joins the main pipe from which it is evacuated in a direction opposite that of the circulation of the anti-icing air.

The invention also has at least one of the following optional characteristics, taken separately or in combination.

It comprises several suction air collection pipes enabling the communication between the double-function channel and the main pipe, said suction air collection pipes being separated from one another along the double-function channel, and it further comprises, associated with each suction-air collection pipe, a second non-return valve enabling the suction air to go only from the suction-air collection pipe, to the main pipe. The multiplication of the suction air collection pipes advantageously allows for a more homogeneous suction along the longitudinal direction of the double-function channel.

Preferably, the system comprises in addition:
- a plurality of anti-icing channels, with each anti-icing channel communicating with the anti-icing air-intake pipe;
- an anti-icing air collection pipe communicating with the anti-icing channels;
- a third non-return valve enabling the anti-icing air to go only from the inside to the outside of the anti-icing air collection pipe;
- a plurality of boundary-layer suction channels, with each channel being partially delimited by a multiperforated wall allowing for the suction of the boundary layer on said aerofoil;
- at least one suction air collection secondary pipe allowing for the communication between the suction channels of the boundary layer, and the main pipe; and
- a fourth non-return valve enabling the suction air to go only from the suction air collection secondary pipe, to the main pipe.

Preferably, the system comprises several suction air collection secondary pipes allowing for the communication between the suction channels of the boundary layer, with the suction air collection secondary pipes being spaced apart from one another along the suction channels, and the system further comprises, associated with each suction air collection secondary pipe, a fourth non-return valve enabling the suction air to go only from the suction air collection secondary pipe, to the main pipe. Here again, the multiplication of the suction air collection secondary pipes allows for a more homogeneous suction along the suction channels.

Preferably, at least some of the anti-icing channels and boundary-layer suction channels are arranged alternately. The specific arrangement retained for these channels is of course according to the needs encountered in terms of anti-icing and boundary-layer suction.

Preferably, the system successively comprises, in a chord direction starting from a leading edge of the aerofoil:
- said double-function channel;
- a plurality of said anti-icing channels; then
- an alternating between said air suction channels and the other anti-icing channels, with said anti-icing channels, air suction channels and double-function channel extending in parallel to one another, according to a spanwise direction of the aerofoil.

Alternatively, the invention could have the form of another type of design wherein the channels do not follow the spanwise direction of the aerofoil, but follow a substantially orthogonal direction, referred to as chord direction. In the first preferred case where the channels substantially follow the spanwise direction of the aerofoil, the design is referred to as "longitudinal concept", while in the second case, reference is made to a "chord design".

Preferably, the anti-icing air-intake pipe, each suction-air collection pipe, each suction air collection secondary pipe and the anti-icing air collection pipe each follow the aerodynamic profile of the aerofoil, by being arranged in parallel planes, spaced apart from one another according to a spanwise direction of this aerofoil. In other terms, these pipes follow the chord direction.

Preferably, the system comprises a fifth non-return valve connected to the downstream end of the double-function channel, according to the direction of circulation of the anti-icing air through this double-function channel, with the fifth non-return valve enabling the anti-icing air to only go from the inside to the outside of the double-function channel. The fifth valve therefore makes it possible, in boundary-layer suction mode, to ensure that the suction is carried out correctly by the multipiercing of the outer skin, not by the main outlet orifice associated with this fifth valve.

Preferably, the system is configured in such a way that the anti-icing air escaping through the fifth valve does not circulate through the anti-icing air collection pipe. The segregation carried out advantageously makes it possible to prevent the anti-icing air from circulating substantially through the double-function channel before being evacuated by the multiperforation, and this to the detriment of the circulation of the air in the anti-icing channels. In order to limit this phenomenon, it is for example provided that the double-function channel has an anti-icing air main outlet orifice associated with the fifth valve, that the anti-icing air collection pipe has an anti-icing air secondary outlet orifice associated with the third valve, and that the main orifice has a smaller section than the secondary orifice. This makes it possible to increase the pressure of the anti-icing air within the double-function channel, and therefore to better distribute the air between this multiperforated double-function channel, and the non-multiperforated anti-icing channels. These two orifices, main and secondary, also make it possible to calibrate the convective thermal exchanges in the anti-icing channels.

Preferably, the double-function channel has an anti-icing air inlet orifice, of which the section is more substantial than that of the anti-icing air main outlet orifice. This also constitutes an artifice in order to increase the air pressure within the double-function channel.

Preferably, the double-function main pipe extends according to a spanwise direction of the aerofoil, and that the design of the system is of the "longitudinal design" type or "chord concept".

The invention also has for object an aerofoil for an aircraft comprising at least one anti-icing and boundary-layer suction system, such as described hereinabove. The aerofoil is preferentially a wing or an empennage, more preferably a vertical empennage, or possibly a horizontal empennage.

Finally, the invention also has for object an aircraft comprising at least one such aerofoil or at least one such system for anti-icing and boundary-layer suction.

Other advantages and characteristics of the invention shall appear in the non-limiting detailed description hereinbelow.

BRIEF DESCRIPTION OF THE DRAWINGS

The invention can be better understood when reading the following detailed description, of examples of non-limiting embodiments of the latter, as well as when examining the annexed drawings among which;

FIGS. 6a to 7b show perspective views that show the means implemented for the supply of the anti-icing channels of the system, and pour the collection of the anti-icing air;

DETAILED DESCRIPTION OF PARTICULAR EMBODIMENTS

Figure 1:
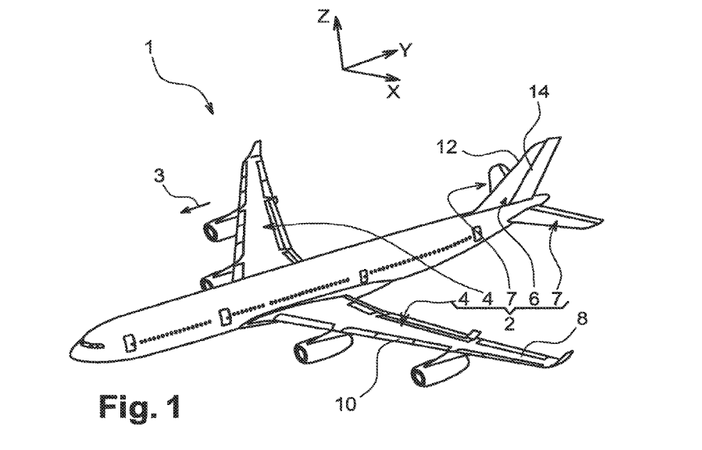
FIG. 1 shows a perspective view of an aircraft provided with two wings according to the invention.

In reference to FIG. 1, an aircraft 1 of the commercial aircraft type is shown, whereon this invention is applied. Conventionally, the aircraft 1 comprises a set 2 of aerofoils comprising two wings 4, a vertical empennage 6 also referred to as "vertical drift", and two horizontal empennages 7. The invention applies particularly to the front portion 10 of the wings 4 and the vertical empennage 6, but can also be applied to the horizontal empennages 7. In this respect, note that in the description, the terms "front" and "rear" are to be considered according to a forward direction 3 of the aircraft, following the thrust exerted by its engines.

The invention relates to an anti-icing and boundary-layer suction system 20 on an aerofoil. In the description hereinbelow, the aerofoil is one of the wings 4, and the system 20 is implanted inside the front portion 10 of this wing, comprising the leading edge. However, note that the invention could be applied identically or similarly to the other wing 4, or to the front portion of the vertical empennage 6.

Figure 2:
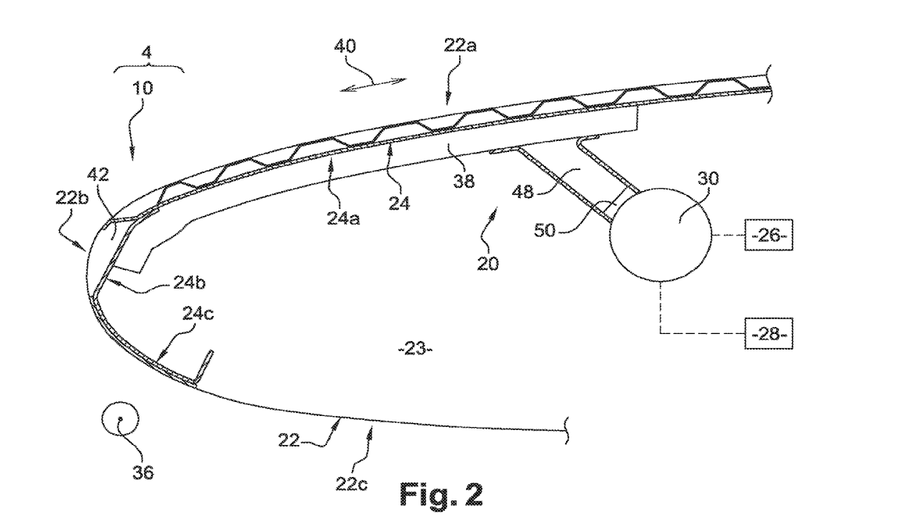
FIG. 2 shows a diagrammatical view as a cross-section of a front portion of one of the wings of the aircraft shown in the preceding figure, with the wing being provided with a system for anti-icing and boundary-layer suction, according to a preferred embodiment of the invention.

In reference to FIG. 2, this figure shows the front portion 10 of the wing integrating the system 20. The front portion 10 comprises an outer skin 22 successively defining an upper surface zone 22a, a nose zone 22b and a bottom surface zone 22c. Moreover, the system 20 comprises an inner skin 24 also comprising an upper surface zone 24a, a nose zone 24b and a bottom surface zone 24c. The two upper surface zones 22a, 24a are spaced apart from one another in such a way as to define a plurality of air circulation channels, of which details shall be provided hereinafter and which can be manufactured in the way disclosed in document EP 1 327 489. The two nose zones 22b, 24b are also spaced apart from one another, in such a way as to define between them a double-function channel, which shall also be described hereinbelow. On the other hand, the two bottom surface zones 22c, 24c are substantially thrust against one another, being however specified that in this zone, the inner skin 24 extends only over a short length towards the rear, as can be seen in FIG. 2.

In reference jointly to FIGS. 2 to 5, the system 20 for the dual management of the anti-icing function and of the suction of the boundary layer first of all comprises a device 26, for monitoring the suction of the boundary layer. This is more preferably a conventional device, of the electrically controlled regulator valve type, that makes it possible to adjust the flow rate of air intended to be sucked by a pump or similar (not shown). For the purposes of information, note that conventionally, the pump is arranged outside of the wing.

Furthermore, the system 20 comprises a device 28 for monitoring anti-icing, with this device also being conventional, preferably of the electrically controlled regulator valve type. This valve 28, also referred to as WAIV (Wing Anti-Icing Valve), makes it possible to adjust the flow rate of hot air taken from the engines and injected between the outer and inner skins in order to prevent the icing of the zones concerned. This hot air taken from the engines is referred to as "anti-icing air".

The two devices 26, 28 are both connected on a main pipe 30 of the system 20, with this pipe having a double function given that it is used both during the boundary-layer suction phases and during the anti-icing phases, as shall be seen clearly hereinafter. By way of an example for the purposes of information, the device 26 can be directly placed on the main pipe 30, while the device 28 can be placed on a bifurcation pipe 32 that is connected to the main pipe.

The main pipe 30 is straight, extending parallel to the span wise direction 36 of the wing, in the free space 23 of the front portion 10 of the wing, defined between the upper surface zones 22a, 24a and the bottom surface zone 22c. At the end opposite that whereon the valves 26, 28 are, the main pipe 30 is sealed off.

As mentioned hereinabove, the system 20 comprises a plurality of air circulation channels, defined between the outer 22 and inner 24 skins, and arranged in parallel to the spanwise direction 36, by being substantially straight. From the front to the rear, this is successively a double-function channel 42, a plurality of adjacent anti-icing channels 44, then an alternating between air suction channels 46 and other anti-icing channels 44.

The double-function channel 42 is specific since it is provided to have circulate therein alternatively the anti-icing air, and air for boundary-layer suction. In order to implement this second function, the nose zone 22b delimiting the channel 42 takes the form of a multiperforated wall allowing for the suction of the boundary layer, in a manner known to those skilled in the art. The outer skin 22 as such has a multiperforation at this location of the nose zone 22b.

Such a multiperforation is also provided on the portions of the upper surface zone 22a delimiting the boundary-layer suction channels 46. On the other hand, the other portions of the upper surface zone of the outer skin 22, delimiting the anti-icing channels 44, are devoid of such multiperforation since they are not dedicated to the suction of the boundary layer. Note that the distribution of the channels 42, 44, 46 is here given solely by way of an example for the purposes of information, but this distribution can be adapted according to the specific needs encountered on each aerofoil, in terms of anti-icing and suction.

The channels 44, 46 have sections of identical or similar sizes and shapes, for example of trapezoidal section. The double-function channel 42, located on the nose, has a more substantial section, of a more complex shape.

The system 20 moreover comprises a plurality of pipes making it possible to have the channels 42, 44, 46 communicate with the main pipe 30. These pipes, which shall be described hereinafter, each extend according to a chord direction 40 by being arranged in orthogonal planes spaced apart from one another according to the spanwise direction 36. These pipes are not straight, but they each follow the aerodynamic profile of the wing by being housed under the inner skin 24. Each one of them takes the form of a cover open upwards and thrust against the inner skin 22, with the latter therefore participating in the forming of these pipes. Alternatively, at least some of these pipes can be carried out directly by a particular shaping of the inner skin 24.

This is first of all an anti-icing air-intake pipe 38, connected to the main pipe 30 as close as possible to the valve 28. More precisely, this connection is carried out by a junction pipe 48 of short length, located on or in the vicinity of a rear end of the pipe 38. The junction pipe 48 is equipped with a first non-return valve 50 enabling only the anti-icing air to go from the main pipe 30 to the pipe 38. A fluidic communication in the other direction is as such prohibited by the valve 50.

Figure 6A:
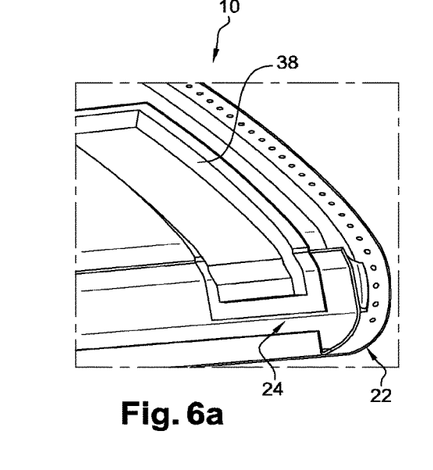
Figure 6B:
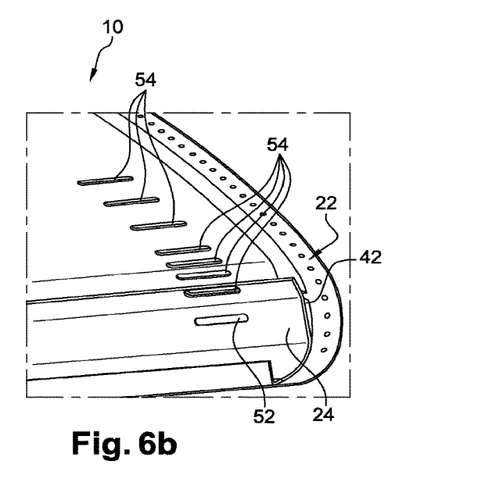

At its front end, the anti-icing air-intake pipe 38 communicates with a first end of the double-function channel 42, through the bias of an anti-icing air inlet orifice 52 made through the inner skin 24. Analogous orifices 54 are provided along the chord direction 40, in such a way as to provide the communication between the pipe 38 and the anti-icing channels 44. Such orifices 52, 54 can for example be of circular section as was shown diagrammatically in FIG. 3, or of oblong shape as can be seen in FIG. 6*b*. In this respect, not that this FIG. 6*b* corresponds to FIG. 6*a*, without the pipe 38 which was removed in order to make these orifices 52, 54 visible.

Figure 3:
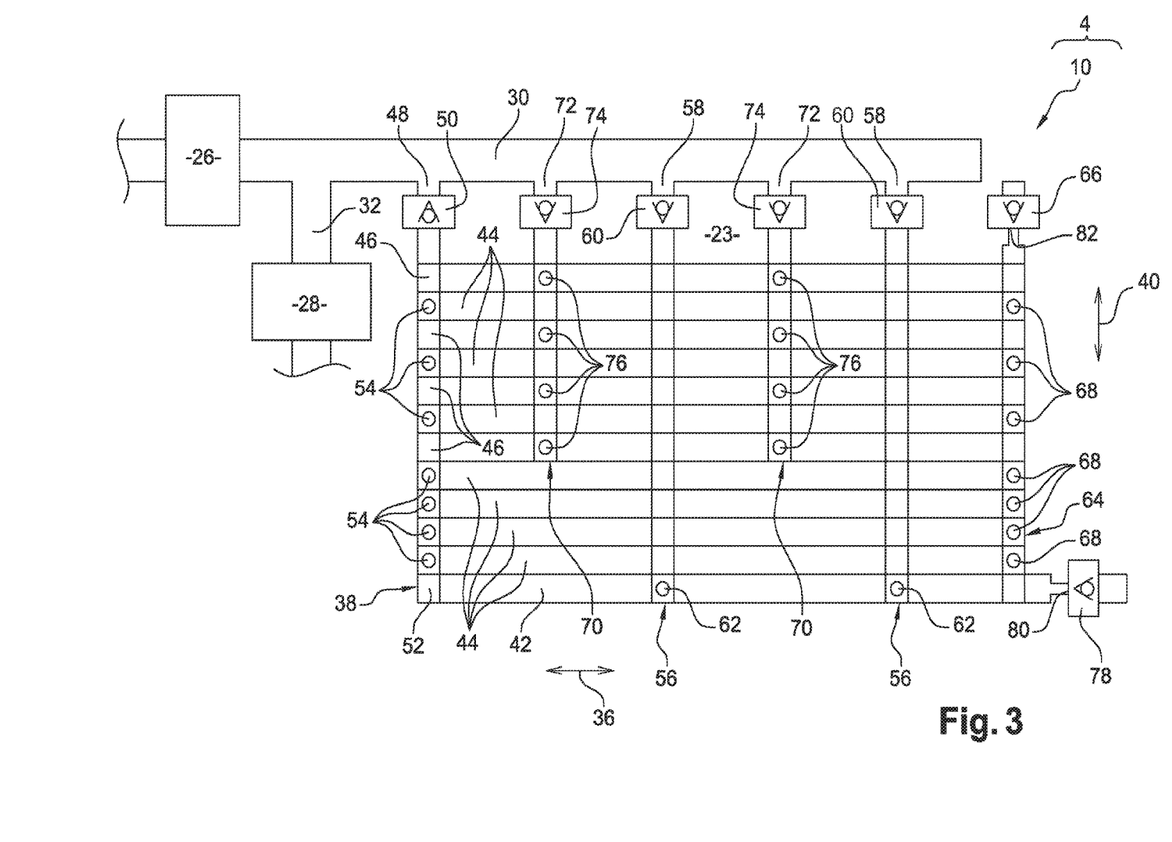
FIG. 3 is a diagrammatical top view of the system.
Figure 4:
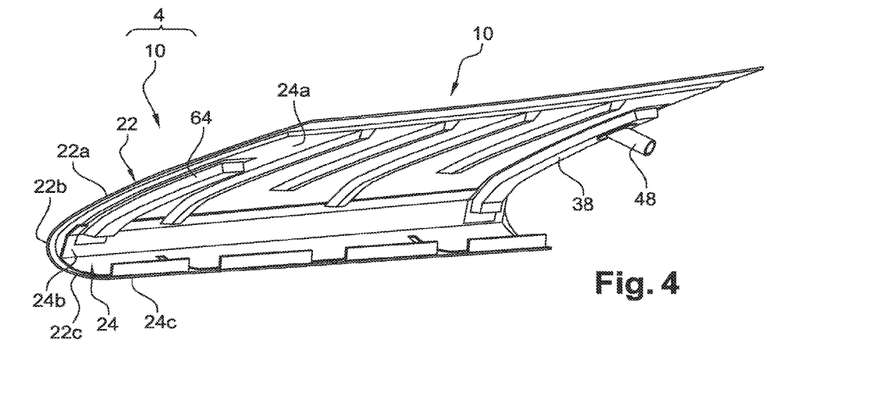
FIG. 4 is a perspective view of that shown in FIG. 2.

The system 20 further comprises suction air collection pipes 56, of which two are shown in FIG. 3. These pipes 56 are each connected to the main pipe 30, downstream of the pipe 38. For each pipe 56, the connection is carried out using a junction pipe 58 of short length, located on or in the vicinity of a rear end of the pipe 56. The junction pipe 56 is provided with a second non-return valve 60 enabling the suction air to go only from the pipe 56 to the main pipe 30. A fluidic communication in the other direction is as such prohibited by the valve 60.

At its front end, each suction-air collection pipe 56 communicates with the double-function channel 42, through the bias of a suction orifice 62 made through the inner skin 24.

The two suction air collection pipes 56 are spaced apart from one another along the double-function channel 42. They are connected to the latter downstream of the connection of the pipe 38, facing a direction of circulation of the anti-icing air through the channel 42 during an anti-icing phase.

The system 20 also comprises an anti-icing air collection pipe 64, that communicates with the anti-icing channels 44 on one end of those opposite the connection end with the pipe 38. The pipe 64 is as such arranged at the end of the front portion 10 of the wing, opposite the end housing the anti-icing air-intake pipe 38.

At its downstream end, the anti-icing air collection pipe 64 is provided with a third non-return valve 66 enabling the anti-icing air to go only from the inside to the outside of this pipe 64. A fluidic communication in the other direction is as such prohibited by the valve 66.

The communication between the pipe 64 and the anti-icing channels 66 is carried out through the bias of anti-icing air collection orifices 68, also made through the inner skin 24. These orifices 68 are as such arranged at the downstream end of the anti-icing channels 44, facing a direction of circulation of the anti-icing air through these channels 44 during an anti-icing phase.

Figure 7A:
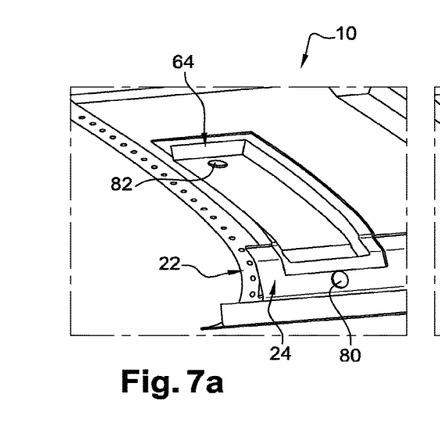
Figure 7B:
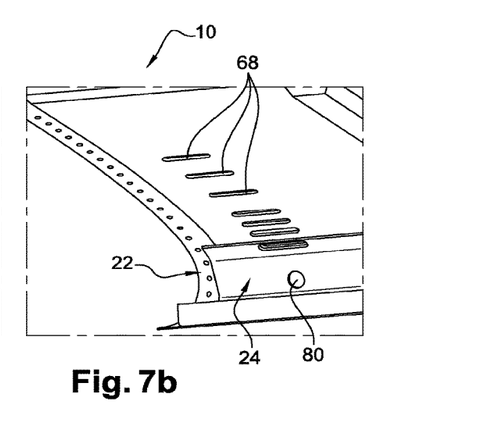

Such orifices 68 can for example be of a circular section such as has been shown diagrammatically in FIG. 3, or of oblong shape such as can be seen in FIG. 7*b*. In this respect, note that this FIG. 7*b* corresponds to FIG. 7*a*, without the pipe 64 which was removed in order to make the orifices 68 visible.

The rear end of the pipe 64 opens into the free space 23 of the front portion 10, without being connected to the main pipe 30.

The system 20 also comprises several suction air collection secondary pipes 70, of which two have been shown in FIG. 3. These pipes 70 are each connected to the main pipe 30, downstream of the pipe 38. For each pipe 70, the connection is carried out using a junction pipe 72 of short length, located on or in the vicinity of a rear end of the pipe 70. The junction pipe 72 is provided with a fourth non-return valve 74 enabling the suction air to go only from the pipe 70 to the main pipe 30. A fluidic communication in the other direction is as such prohibited by the valve 74.

Figure 5:
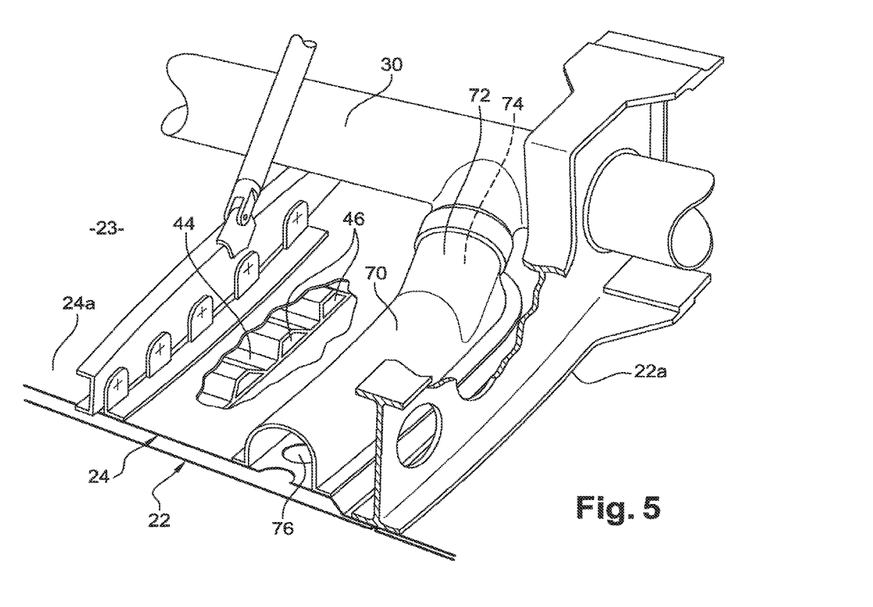
FIG. 5 is a partial and enlarged view of that shown in the preceding figure, according to another angle of perspective.

Each suction air collection secondary pipe 70 communicates with each one of the suction channels 46, through the bias of secondary suction orifices 76 made through the inner skin 24, such as shown in the enlarged view of FIG. 5.

The two suction air collection pipes 56 are spaced apart from one another along the suction channels 46, and are arranged between the pipes 38 and 64 for managing the anti-icing function. Furthermore, they can be arranged alternately with the two suction air collection pipes 56.

Finally, at the downstream end of the double-function channel 42, the system 20 is provided with a fifth non-return valve 78 enabling the anti-icing air to go only from the inside to the outside of this channel 42. A fluidic communication in the other direction is as such prohibited by the valve 78, and the air escaping through this latter penetrates into the free space 23 of the front portion 10, without transiting by the main pipe 30 to which the downstream end of the channel 42 is not connected. In addition, this downstream end of the double-function channel 42 is also not connected to the anti-icing air collection pipe 64, in such a way that the air escaping through the valve 78 also does not transit through this pipe 64.

Still on this downstream end of the double-function channel 42, upstream of the valve 78, an anti-icing air main outlet orifice 80 is made, which can be seen best in FIGS. 7*a* and 7*b*. As with the anti-icing air collection orifices 68, this main orifice 80 is made through the inner skin 24, but not covered by the pipe 64 in such a way as to not communicate with the latter. Moreover, note that upstream of the third valve 66, the downstream end of the anti-icing air collection pipe 64 has an anti-icing air secondary outlet orifice 82, which can be seen best in FIG. 7*a*. The segregation between the outlet orifices 80, 82 makes it possible to prevent the anti-icing air from circulating substantially through the multiperforated double-function channel 42, and this to the detriment of the circulation of the air in the anti-icing channels 44. Indeed, it is preferentially provided that the main orifice 80 has a smaller section than that of the secondary orifice 82. During the anti-icing phases, this causes an increase in the pressure within the double-function channel 42, and as such favours a better distribution of the anti-icing air between the double-function channel 42 on the one hand, and the anti-icing channels 44 on the other hand. Moreover, note that in order to increase the air pressure within the double-function channel 42, it is also preferentially arranged that the section of the anti-icing air inlet orifice 52 be greater than the section of the anti-icing air main outlet orifice 80, located at the opposite end on this same channel.

Figure 8:
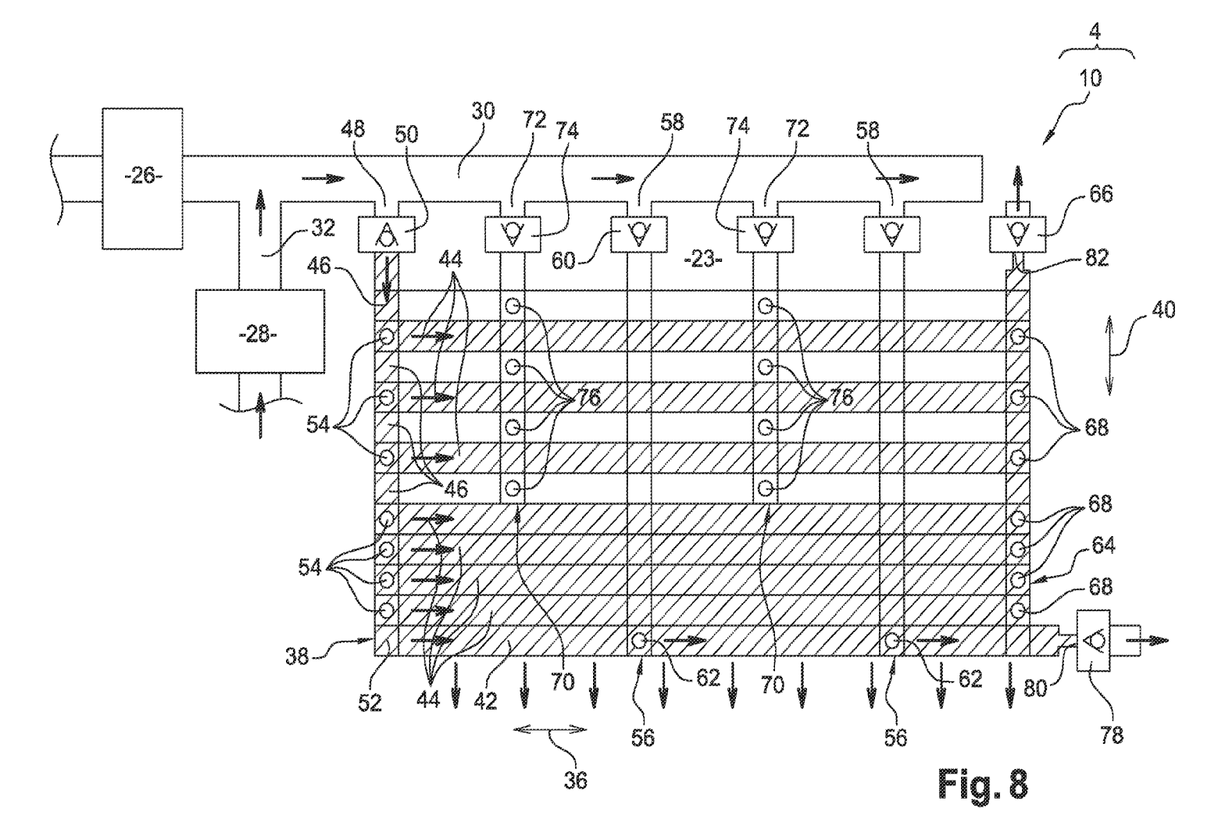
FIG. 8 is a view similar to that of FIG. 3, diagramming the operation of the system during an anti-icing phase of the wing.
Figure 9:
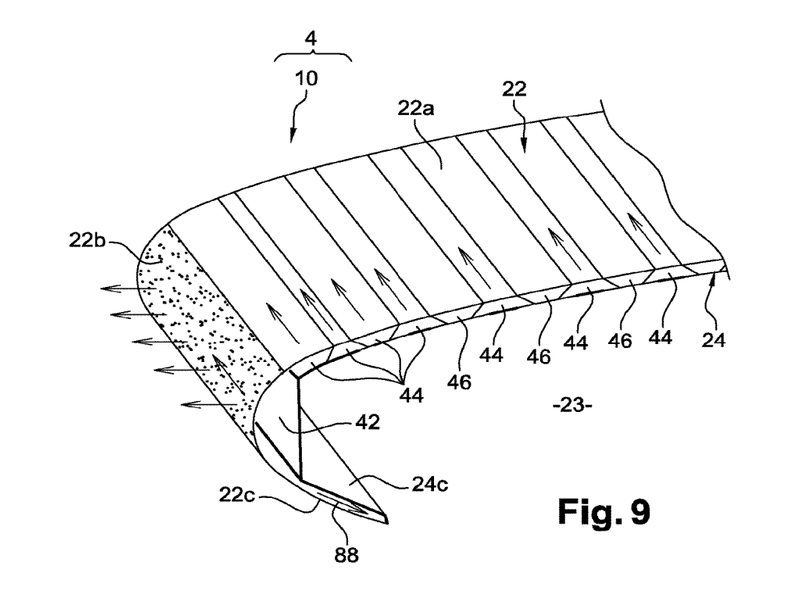
FIG. 9 is a perspective view of the front portion of the wing, also diagramming the operation of the system during an anti-icing phase.
Figure 10:
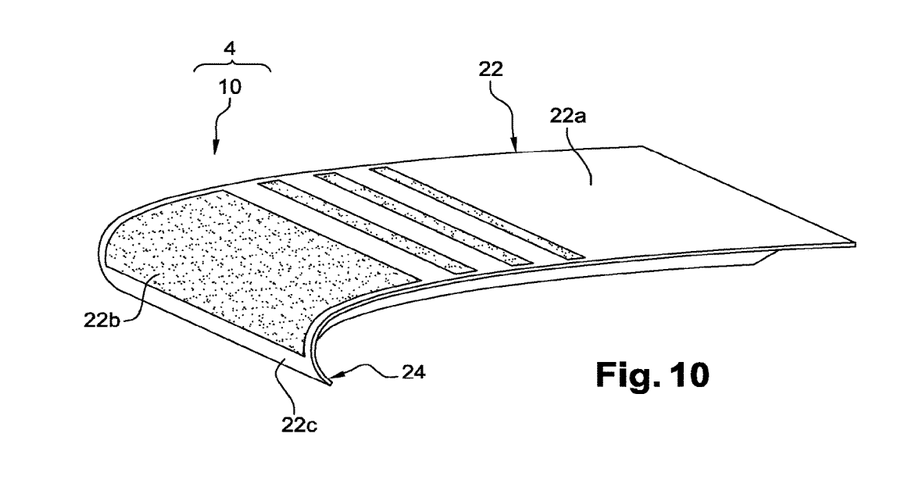
FIG. 10 is a perspective view showing the zones of the wing that benefit from the anti-icing function.

In reference to FIGS. 8 to 10, this figure shows the operation of the system 20 during an anti-icing phase of the front portion 10 of the wing 4. In these figures, the arrows symbolise the direction of circulation of the air through the various elements of the system. In addition, the greyed out and hatched zones correspond to the zones borrowed by the anti-icing air.

In order to activate the anti-icing function, the WAIV valve 28 is controlled in such a way as to allow hot air coming from the engines to circulate, through the main pipe 30. The air then transits through the first valve 50 before joining the anti-icing air-intake pipe 38, from which this hot air is distributed into the double-function channel 42 via the orifice 52, and into the anti-icing channels 44 via the orifices 54. At the outlet of these channels 44, the anti-icing air is collected by the pipe 64 via the orifices 68, then the air is ejected into the free space 23 through the third valve 66. The heating of the outer skin 22 is therefore carried out via convection on anti-icing channels 44, and by simple conduction on adjacent suction channels 46.

From the pipe 38, the hot air also circulates through the double-function channel 42, after having borrowed the orifice 52. It is then evacuated through the fifth valve 78. During its circulation through the channel 42, the anti-icing air is also partially evacuated through multiperforation on nose zone 22b of the outer skin 22, and by the slots provided between the thrust upper surface zones 22c, 24c, as has been diagrammed by the arrow 88 in FIG. 9.

During this anti-icing phase, as mentioned hereinabove, the air occupying the pipes 56 cannot penetrate within the main pipe 30 via the valves 60, due to the higher air pressure in this pipe 30 sealed off at its downstream end. In addition, the boundary-layer suction channels 46 are not supplied with hot air, therefore remain inoperative during this anti-icing phase.

Figure 11:
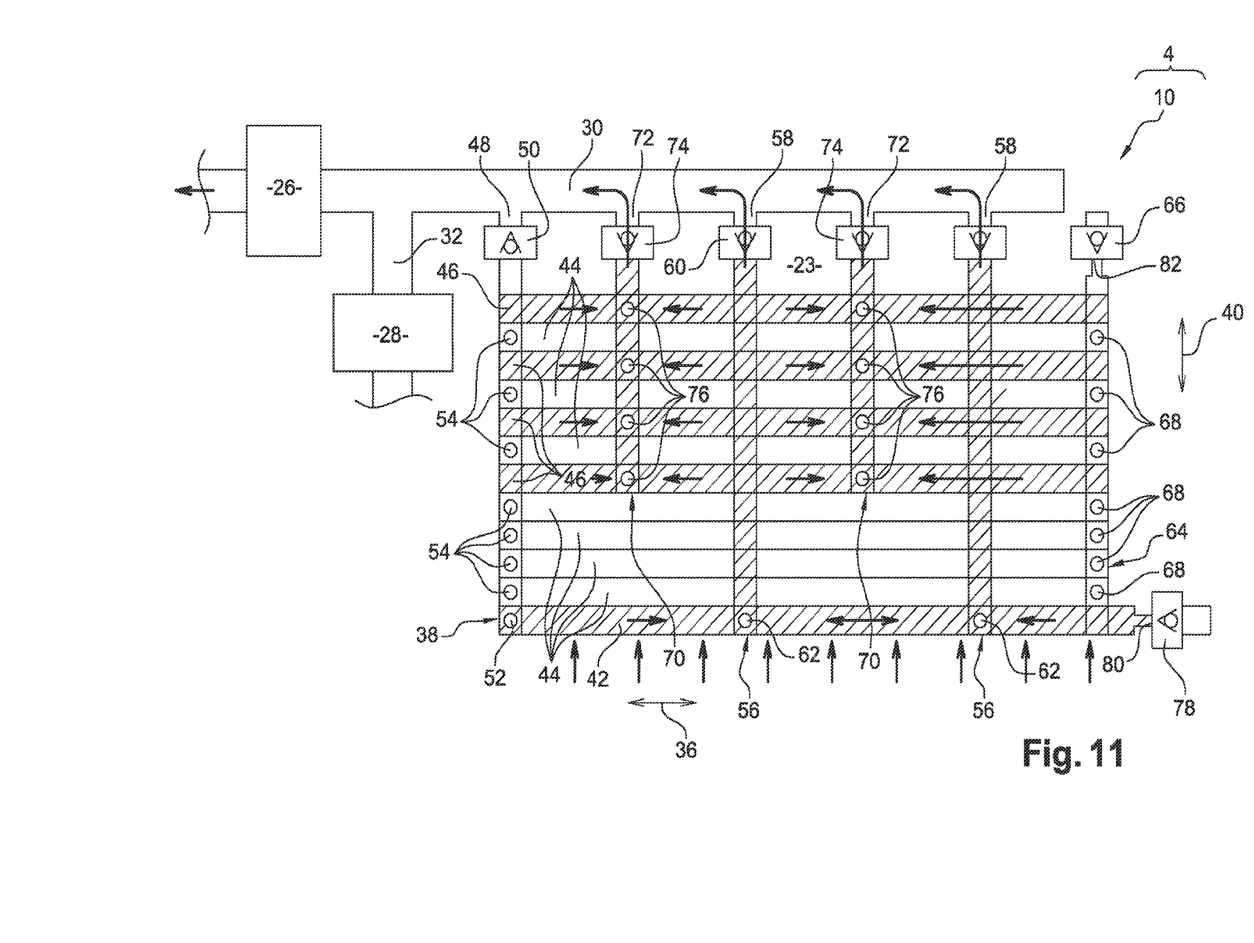
FIGS. 11 to 13 respectively show views similar to those of FIGS. 8 to 10, diagramming the operation of the system during a boundary-layer suction phase.
Figure 12:
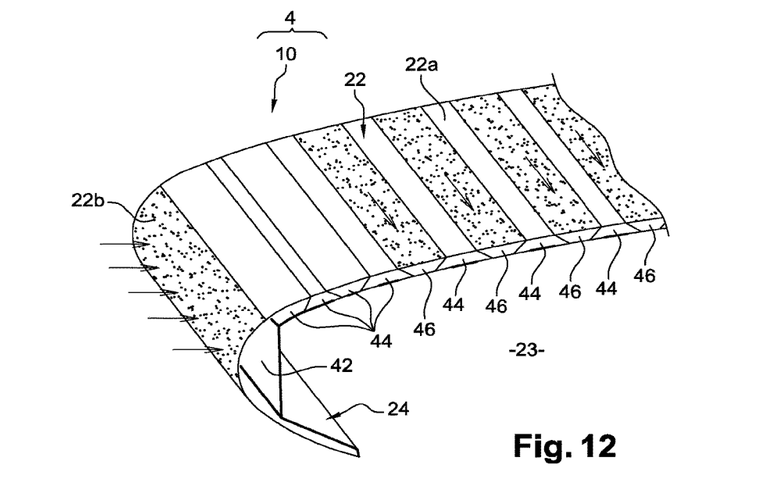
Figure 13:
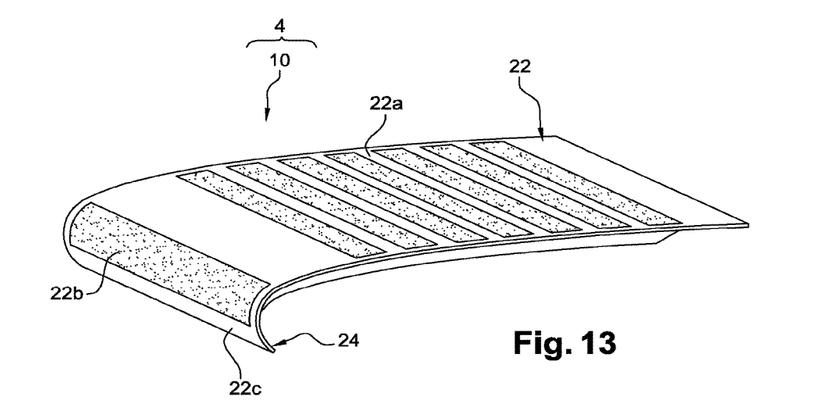

In reference to FIGS. 11 to 13, these figures show the operation of the system 20 during a boundary-layer suction phase on the front portion 10 of the wing 4. In these figures, the arrows symbolise the direction of circulation of the air sucked through the various elements of the system. In addition, the greyed out and hatched zones correspond to the zones borrowed by the suction air.

In order to activate the boundary-layer suction function, the valve 26 is controlled in such a way as to suck air by the main pipe 30.

Upstream, the suction is carried out first of all on the multiperforation of the double-function channel 42, by the nose zone 22b. This air then joins the pipes 56 via the orifices 62, then penetrates into the main pipe 30 after having transited through the valves 60.

The suction is also carried out by the multiperforations of the suction channels 46, on the upper surface zone 22a of the outer skin 22. The air circulating in the channels 46 then joins the pipes 70 via the orifices 76, then penetrates into the main pipe 30 after having transited through the valves 74.

During this boundary-layer suction phase, since the anti-icing channels 44 are not multiperforated, they remain inoperative.

Of course, various modifications can be made by those skilled in the art to the invention that has just been described, solely by way of non-limiting examples. In this respect, note that the design described hereinabove is of the "longitudinal concept" type, with a circulation of the anti-icing air referred to as "simple flow". This simple circulation implies that the anti-icing air circulate from one end to the other of the portion of the wing concerned by the system, in a single direction according to the spanwise direction. However, the invention also applies to a longitudinal design wherein the circulation of the anti-icing air is deferred top as "centred" ("centre flow"), with anti-icing air intake pipes centred on the portion of the wing concerned by the system, and anti-icing air collection pipes arranged at the ends of this same portion. In this case, the anti-icing air circulates longitudinally from the centre to the ends of the wing. The invention further applies to a longitudinal design wherein the circulation of the anti-icing air operated in a reverse manner in relation to the preceding solution (referred to as "baseline flow"). In this case, the anti-icing air collection pipes are centred on the portion of the wing concerned by the system, and the anti-icing air intake pipes are arranged at the ends of this same portion. The anti-icing air then circulates longitudinally from the ends of the wing, to the centre.

Moreover, the invention also applies to designs of the "chord concept" type, wherein the channels do not follow the spanwise direction of the wing, but follow the chord direction.

Finally, note that the same aerofoil such as a wing can be provided with several systems such as described in detail hereinabove. These systems are preferentially arranged adjacently along the spanwise direction. They can then share one or several elements, for example have in common the same single main pipe 30.

The invention claimed is:

1. An anti-icing and boundary-layer suction system, configured to be provided on an aerofoil of an aircraft, the system comprising:
   at least one double-function channel that can alternatively circulate air for an anti-icing function and air for a boundary-layer suction, the double-function channel being partially delimited by a multiperforated wall allowing for suction of the boundary layer on the aerofoil;
   a device for monitoring suction of the boundary layer;
   a device for monitoring anti-icing;
   a main double-function pipe, to which are connected the device for monitoring the suction of the boundary layer and the device for monitoring anti-icing;
   an anti-icing air-intake pipe allowing for communication between the main pipe and the double-function channel;
   a first non-return valve enabling the anti-icing air to go only from the main pipe to the anti-icing air-intake pipe;
   at least one suction-air collection pipe enabling communication between the double-function channel and the main pipe; and
   a second non-return valve enabling the suction air to go from the suction-air collection pipe to the main pipe.

2. A system according to claim 1, comprising plural suction air collection pipes enabling the communication between the double-function channel and the main pipe, the suction air collection pipes being spaced apart from one another along the double-function channel, and
   further comprising, associated with each suction-air collection pipe, a second non-return valve enabling the suction air to go only from the suction-air collection pipe to the main pipe.

3. A system according to claim 1, further comprising:
   a plurality of anti-icing channels, with each anti-icing channel communicating with the anti-icing air-intake pipe;
   an anti-icing air collection pipe communicating with the anti-icing channels;
   a third non-return valve controlling the anti-icing air to go only from inside to outside of the anti-icing air collection pipe;
   a plurality of boundary-layer suction channels, with each suction channel being partially delimited by a multiperforated wall allowing for suction of a boundary layer on the aerofoil;
   at least one suction air collection secondary pipe allowing for communication between the suction channels of the boundary layer and the main pipe; and
   a fourth non-return valve enabling the suction air to go from the suction air collection secondary pipe to the main pipe.

4. A system as claimed in claim 1, further comprising a fifth non-return valve connected to a downstream end of the double-function channel, according to a direction of circulation of the anti-icing air through the double-function channel, the fifth non-return valve enabling the anti-icing air to go only from inside to outside of the double-function channel.

5. A system as claimed in claim 1, wherein the main double-function pipe extends according to a spanwise direction of the aerofoil.

6. An aerofoil for an aircraft comprising at least one anti-icing and boundary-layer suction system as claimed in claim 1.

7. An aircraft comprising at least one anti-icing and boundary-layer suction system according to claim 1.

8. A system according to claim 3, comprising plural suction air collection secondary pipes allowing for communication between the suction channels of the boundary layer, with the suction air collection secondary pipes being spaced apart from one another along the suction channels, and further comprising, associated with each suction air collection secondary pipe, a fourth non-return valve enabling the suction air to go only from the suction air collection secondary pipe to the main pipe.

9. A system according to claim 3, wherein at least some of the anti-icing channels and of the boundary-layer suction channels are arranged alternately.

10. A system according to claim 3, successively comprising, in a chord direction starting from a leading edge of the aerofoil:

the double-function channel;
a plurality of the anti-icing channels; then
an alternating between the air suction channels and the other anti-icing channels,
the anti-icing channels, the suction channels, and the double-function channel extending in parallel to one another, according to a spanwise direction of the aerofoil.

11. A system according to claim 3, wherein the anti-icing air-intake pipe, each suction-air collection pipe, each suction air collection secondary pipe, and the anti-icing air collection pipe each follow an aerodynamic profile of the aerofoil, by being arranged in parallel planes, spaced apart from one another according to a spanwise direction of the aerofoil.

12. A system as claimed in claim 4, configured such that the anti-icing air escaping through the fifth valve does not circulate through an anti-icing air collection pipe.

13. A system as claimed in claim 12, wherein the double-function channel includes an anti-icing air main outlet orifice associated with the fifth valve, the anti-icing air collection pipe includes an anti-icing air secondary outlet orifice associated with the third valve, and the main orifice has a smaller section than the secondary orifice.

14. A system as claimed in claim 13, wherein the double-function channel includes an anti-icing air inlet orifice, of which a section is greater than that of the anti-icing air main outlet orifice.

15. An aerofoil as claimed in claim 6, which is a wing or an empennage.

16. An aircraft comprising at least one aerofoil according to claim 6.

* * * * *